US009355439B1

(12) United States Patent
Gibson

(10) Patent No.: US 9,355,439 B1
(45) Date of Patent: May 31, 2016

(54) JOINT CONTRAST ENHANCEMENT AND TURBULENCE MITIGATION METHOD

(71) Applicant: The United States of America as represented by the Secretary of the Navy, Washington, DC (US)

(72) Inventor: Kristofor B. Gibson, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 1 day.

(21) Appl. No.: 14/547,759

(22) Filed: Nov. 19, 2014

Related U.S. Application Data

(60) Provisional application No. 62/020,235, filed on Jul. 2, 2014.

(51) Int. Cl.
G06T 5/00 (2006.01)
G06T 5/20 (2006.01)
G06T 5/50 (2006.01)

(52) U.S. Cl.
CPC . *G06T 5/009* (2013.01); *G06T 5/20* (2013.01); *G06T 5/50* (2013.01); *G06T 2207/10016* (2013.01); *G06T 2207/20208* (2013.01); *G06T 2207/30232* (2013.01)

(58) Field of Classification Search
CPC ....... H04N 5/144; H04N 5/145; H04N 7/014; G06T 5/50; G06T 5/20; G06T 7/20; G06T 7/0024; G06T 2207/20201; G06T 5/002; G06K 9/325
See application file for complete search history.

(56) References Cited

U.S. PATENT DOCUMENTS

| | | | | |
|---|---|---|---|---|
| 2004/0247177 | A1* | 12/2004 | Rowe | G06K 9/00288 382/159 |
| 2008/0107346 | A1* | 5/2008 | Zhang | G06T 3/4053 382/215 |
| 2009/0028403 | A1* | 1/2009 | Bar-Aviv | G06F 19/321 382/128 |
| 2011/0211758 | A1* | 9/2011 | Joshi | G06T 5/003 382/167 |

(Continued)

OTHER PUBLICATIONS

Arora, Tarun A., et al. "Evaluation of a New Integrated Fog Removal Algorithm IDCP with Airlight", I.J. Image, Graphics and Signal Processing, MECS Press, vol. 6, No. 8, pp. 12-18, 2014.

(Continued)

*Primary Examiner* — Jingge Wu
(74) *Attorney, Agent, or Firm* — SPAWAR Systems Center Pacific; Kyle Eppele; Ryan J. Friedl

(57) ABSTRACT

A method involves generating a denoised image by performing a denoising operation on an input image of an object, the input image having turbulence and a contrast reducing scattering medium therein, generating a contrast enhanced image from the denoised image using a contrast enhancement algorithm, estimating a global motion vector of the contrast enhanced image using an image alignment algorithm, generating a contrast enhanced aligned image by globally aligning the contrast enhanced image to the global motion vector and locally aligning the contrast enhanced image with an optical flow method, temporally averaging the contrast enhanced aligned image, and generating an output image of the object by performing a deblur operation on the temporally averaged contrast enhanced aligned image. The method may further include measuring turbulence using sequences of input images and output images.

16 Claims, 5 Drawing Sheets

(56) References Cited

U.S. PATENT DOCUMENTS

| | | | |
|---|---|---|---|
| 2011/0235942 A1* | 9/2011 | Luo | G06T 5/003 |
| | | | 382/275 |
| 2012/0218442 A1* | 8/2012 | Jandhyala | G06T 7/20 |
| | | | 348/239 |
| 2013/0016180 A1* | 1/2013 | Ono | H04N 5/145 |
| | | | 348/36 |
| 2013/0084024 A1* | 4/2013 | Yokokawa | G06T 5/002 |
| | | | 382/274 |
| 2013/0128061 A1* | 5/2013 | Hsu | H04N 9/045 |
| | | | 348/208.4 |
| 2013/0147974 A1* | 6/2013 | Ju | H04N 5/23248 |
| | | | 348/208.1 |

OTHER PUBLICATIONS

Yu, Jing et al., "Physics-based Fast Single Image Fog Removal", IEEE ICSP Proceedings, pp. 1048-1052, 2010.

N. Joshi and M. F. Cohen, "Seeing Mt. Rainier: Lucky imaging for multi-image denoising, sharpening, and haze removal," in Computational Photography (ICCP), 2010 IEEE International Conference on. IEEE, 2010, pp. 1-8.

D. R. Droege, R. C. Hardie, B. S. Allen, A. J. Dapore, and J. C. Blevins, "A real-time atmospheric turbulence mitigation and super-resolution solution for infrared imaging systems," in SPIE Defense, Security, and Sensing. International Society for Optics and Photonics, 2012, pp. 83 550R-83 550R.

D. L. Fried, "Optical resolution through a randomly inhomogeneous medium for very long and very short exposures," JOSA, vol. 56, No. 10, pp. 1372-1379, 1966.

A. N. Kolmogorov, "The local structure of turbulence in incompressible viscous fluid for very large reynolds numbers," in Dokl. Akad. Nauk SSSR, vol. 30, No. 4, 1941, pp. 299-303.

M. C. Roggemann, B. M. Welsh, and R. Q. Fugate, "Improving the resolution of ground-based telescopes," Reviews of Modern Physics, vol. 69, No. 2, p. 437, 1997.

M. A. Vorontsov and G. W. Carhart, "Anisoplanatic imaging through turbulent media: image recovery by local information fusion from a set of short-exposure images," JOSA A, vol. 18, No. 6, pp. 1312-1324, 2001.

N. Anantrasirichai, A. Achim, N. Kingsbury, and D. Bull, "Atmospheric turbulence mitigation using complex wavelet-based fusion," Image Processing, IEEE Transactions on, vol. 22, No. 6, pp. 2398-2408, Jun. 2013.

E. Matlin and P. Milanfar, "Removal of haze and noise from a single image," in IS&T/SPIE Electronic Imaging. International Society for Optics and Photonics, 2012, pp. 82 960T-82 960T.

D. S. Bolme, J. R. Beveridge, B. A. Draper, and Y. M. Lui, "Visual object tracking using adaptive correlation filters," in Computer Vision and Pattern Recognition, 2010 IEEE Conference on. IEEE, 2010, pp. 2544-2550.

G. Farneback, "Fast and accurate motion estimation using orientation tensors and parametric motion models," in Pattern Recognition, 2000. Proceedings. 15th International Conference on, vol. 1, 2000, pp. 135-139 vol. 1.

K. B. Gibson, D. T. Vo, and T. Q. Nguyen, "An investigation of dehazing effects on image and video coding," IEEE Trans. Image Process., vol. 21, No. 2, pp. 662-673, 2012.

K. Gibson and T. Nguyen, "Fast single image fog removal using the adaptive wiener filter," in Image Processing (ICIP), 2013 20th IEEE International Conference on, Sep. 2013, pp. 714-718.

J.-P. Tarel and N. Hautiere, "Fast visibility restoration from a single color or gray level image," in Computer Vision, 2009 IEEE 12th International Conference on. IEEE, 2009, pp. 2201-2208.

K. He, J. Sun, and X. Tang, "Single Image Haze Removal Using Dark Channel Prior," in CVPR, 2009, pp. 1956-1963.

S. Narasimhan and S. Nayar, "Vision and the atmosphere," in ACM SIGGRAPH Asia 2008 courses. ACM, 2008, pp. 1-22.

C. J. Carrano, "Anisoplanatic performance of horizontal-path speckle imaging," in Optical Science and Technology, SPIE's 48th Annual Meeting. International Society for Optics and Photonics, 2003, pp. 14-27.

S. Chan, R. Khoshabeh, K. Gibson, P. Gill, and T. Nguyen, "An augmented lagrangian method for total variation video restoration," Image Processing, IEEE Transactions on, vol. 20, No. 11, pp. 3097-3111, Nov. 2011.

R. Manduchi and G. A. Mian, "Accuracy analysis for correlation based image registration algorithms," in Circuits and Systems, IEEE International Symposium on. IEEE, 1993, pp. 834-837.

D. Robinson and P. Milanfar, "Fundamental performance limits in image registration," Image Processing, IEEE Transactions on, vol. 13, No. 9, pp. 1185-1199, 2004.

X. Zhu and P. Milanfar, "Image reconstruction from videos distorted by atmospheric turbulence," in IS&T/SPIE Electronic Imaging. International Society for Optics and Photonics, 2010, pp. 75 430S-75 430S.

Xiang, Zhu, "Removing atmospheric turbulence via space-invariant deconvolution," Pattern Analysis and Machine Intelligence, IEEE Transactions on, vol. 35, No. 1, pp. 157-170, 2013.

Shuai, Yanjuan et al., "Image Haze Removal of Wiener Filtering Based on Dark Channel Prior", IEEE Eighth International Conference on Computational Intelligence and Security, pp. 318-322, 2012.

\* cited by examiner

JOINT CONTRAST ENHANCEMENT AND TURBULENCE MITIGATION METHOD

CROSS-REFERENCE TO RELATED APPLICATIONS

This application claims the benefit of U.S. Provisional Patent Application Ser. No. 62/020,235 filed Jul. 2, 2014, entitled "Joint Contrast Enhancement and Turbulence Mitigation Method", the content of which is fully incorporated by reference herein.

FEDERALLY SPONSORED RESEARCH AND DEVELOPMENT

The Joint Contrast Enhancement and Turbulence Mitigation Method is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 103222.

BACKGROUND

A common problem for imaging in the atmosphere is fog and atmospheric turbulence. Previous research has focused on either the fog or turbulence aspects, but not both. A system and method are needed that can incorporate both the atmospheric turbulence and fog aspects for applications such as real-time video processing.

DETAILED DESCRIPTION OF SOME EMBODIMENTS

Figure 1:
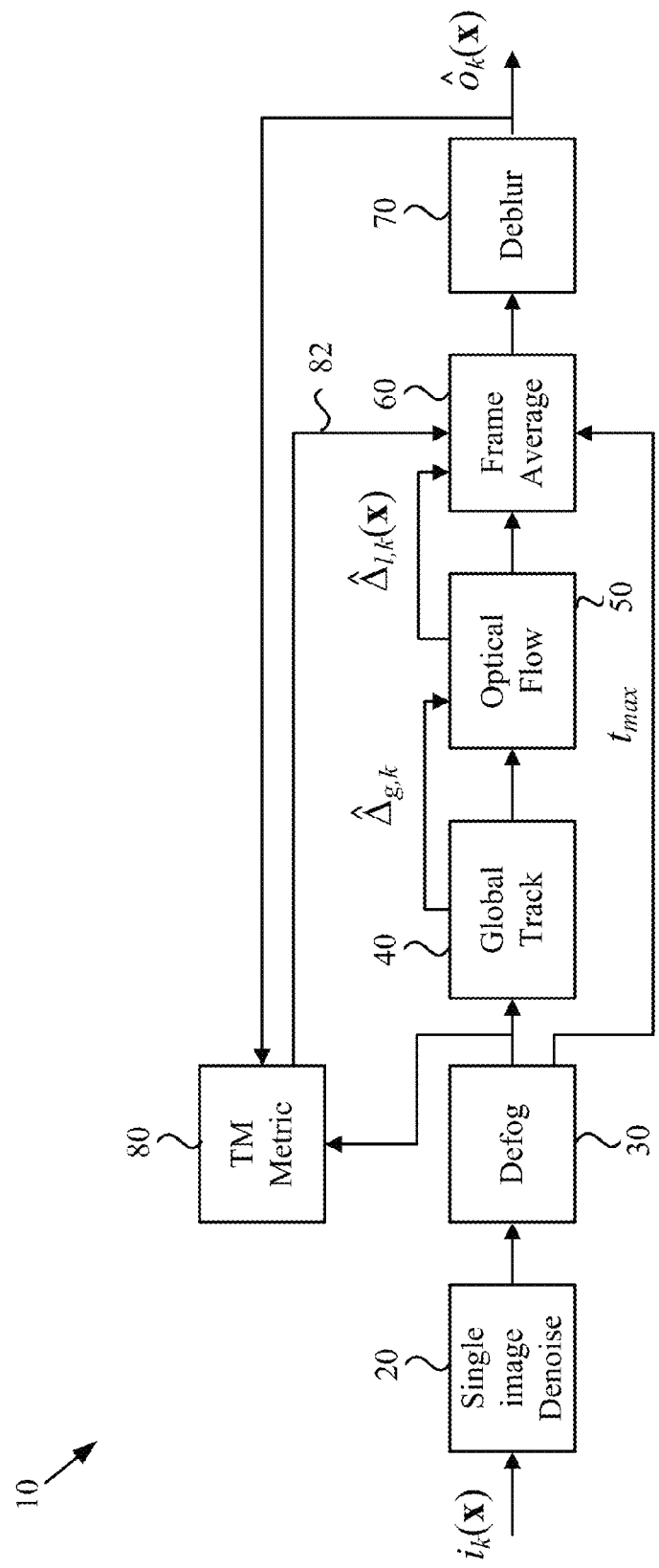
FIG. 1 shows a diagram illustrating the processing for an embodiment of the Joint Contrast Enhancement and Turbulence Mitigation Method.

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The embodiments disclosed herein disclose a joint turbulence mitigation and fog removal method that can recover an object image o(x) fast enough for near real-time performance. The embodiments of the method are based upon analysis in turbulence mitigation and include the fog model. The embodiments of the method perform well for most atmospheric conditions and are efficient for near-real time processing.

Imaging systems positioned near the ocean often suffer in performance, perceptually and objectively, because of atmospheric turbulence, fog, sun-glare, camera motion from wind buffeting and many other adverse weather conditions. For long distance imaging, the most prominent are camera motion, fog, atmospheric turbulence and blur (from optics and atmosphere). An example of a specific imaging environment is an optical system that is observing targets of interest with the optical axis being parallel with the horizon (over-the-horizon viewing). The environment itself will have fog or haze, wind, and heat that causes eddy currents, which are observed as turbulence in an imaging system.

For each wavelength (color), the atmospheric effects in the imaging system are represented with $$i_k(x) = h_k(x) * (t_k(\tilde{x}_k) o_k(\tilde{x}_k) + (1 - t_k(\tilde{x}_k))a) + w_k(x) \quad \text{(Eq. 1)}$$

The ideal image of the object without any atmospheric artifacts at frame k and pixel position $x \in \mathbb{R}^2$ is $o_k(x) \in \mathbb{R}$. The observed image with the dominant artifacts of blur, turbulence, motion and fog is $i_k(x) \in \mathbb{R}$. The contrast degradation from fog is represented with the terms transmission $t(x) \in \mathbb{R}$ and constant scalar airlight $a \in \mathbb{R}$. The image noise that is independent of the atmosphere at frame k is $w_k(x)$. The airlight is the light imaged when the object at x is infinitely far away from the imaging system. An example of a is the brightness observed of fog at the edge of the horizon.

The amount of light decay over distance from the atmospheric scattering medium is spatially varying and depends on the distance from the sensor to the object $d(x) \in \mathbb{R}$ and scattering medium parameter $\beta \in \mathbb{R}$, where the decay is characterized as $$t_k(x) = e^{-\beta d_k(x)}. \quad \text{(Eq. 2)}$$

The global blur from the atmosphere and optical system is modeled with the blur kernel h (x). The observed motion from turbulence and camera motion is $$\tilde{x}_k = \Delta_{g,k} + \Delta_{t,k}(x), \quad \text{(Eq. 3)}$$

with global motion represented with $\Delta_{g,k}$ and local motion from the object and turbulence is $\Delta_{t,k}(x)$. The blur, h(x), is modeled independent of local motion $\tilde{x}$. Although the blur caused by the exposure time is dependent on the turbulent local motion, the motion averaged together is modeled with the kernel $h_k(x)$.

The performance of an optical system imaging through the atmosphere for short and long exposure settings has been sufficiently presented in the literature. A Fried seeing parameter $r_o$ is used to describe the scale of the turbulence. If an optical system has a diameter smaller than $r_o$, then the turbulence is minimized. The modulation transfer function (MTF) of the optical system (including the atmosphere) degrades as the diameter increases above $r_o$. For the embodiments disclosed herein, the diameter of the optical system is assumed to be larger than $r_o$, which is a very common scenario.

The structure constant, $C_n^2$, from Kolmogorov theory is a parameter that "characterizes the strength of index-of-refraction fluctuations". The structure constant is a function of altitude but is assumed constant in all horizontal viewing angles when an optical system is in an ocean environment.

An assumption is made that the imaging system is under isoplanatic conditions (spatially invariant blur) because the optical system is positioned close to the heat source (turbulent generator) which is most common for ground based optics in astronomy and imaging systems positioned near the ocean. Obtaining the image $o_k(x)$ without knowledge of the blur h, transmission t, local motion $\tilde{x}$, or noise statistics is a difficult problem. Many methods have been proposed that account for some knowledge of the physics of the scene, however no method exists that accounts for both turbulence and fog. The embodiments of the method disclosed herein address how to incorporate information from the contrast enhancement process into the turbulence mitigation process.

FIG. 1 shows a diagram 10 illustrating the processing for an embodiment of the Joint Contrast Enhancement and Turbulence Mitigation Method. Given a foggy turbulent image at frame k $i_k(x)$, single image noise removal (denoising) is applied at box 20 and passed into a single image defogging algorithm at box 30. The defogging algorithm estimates the transmission and $t_{max}$ and enhances the contrast image, which then goes into the image alignment algorithm at box 40 to estimate the global motion vector $\hat{\Delta}_{g,k}$. The enhanced image is then aligned with $\hat{\Delta}_{g,k}$ and locally aligned with an optical flow method at box 50 which estimates $\hat{\Delta}_{t,k}(x)$. The globally and locally aligned contrast enhanced image is then temporally averaged with K frames at box 60 and atmospheric blur is removed at box 70 to produce the estimated image of the object $\hat{o}_k(x)$. A turbulence mitigation metric (TMM) is used at box 80 to measure performance by measuring the turbulence between the input and output image sequences. Feedback 82 regarding the TMM may be provided to the frame averaging step at box 60 to automatically change the number of frames to average K.

Contrast enhancement does not improve the image alignment performance when image noise is present. The result in terms of error is the same if enhancement is before or after global tracking Analysis does show, however, that reducing image noise can improve the image alignment performance. Additionally, removing noise before fog removal is a useful approach to improve transmission $\hat{t}$ and airlight $\hat{a}$ estimation. Accordingly, some embodiments of the method disclosed herein remove noise, enhance the contrast and then estimate the global motion $\hat{\Delta}_g$. A data dependent noise removal algorithm may be used because the amount of noise energy that will be enhanced will depend on the transmission. A median filter may also be used because it can preserve edges reasonably well and it is data dependent thus adapts to the image signal.

To reduce the complexity of the algorithm such that the processing speed is near real-time, a two dimensional median filter may be used for each color channel for fast single image denoising. The denoising step should not be too aggressive in reducing spatial frequencies because important details can be lost and are unable to be recovered during the frame averaging and deblurring steps. If noise removal is too aggressive, it effectively imposes premature bandwidth limitation and high frequency regions will be lost before the bandwidth recovery process (deblurring). As an example, a very small window 3×3 may be used for the median filtering step for denoising.

Some embodiments of the disclosed method may employ the adaptive correlation filter, Minimum Output Sum of Squared Error (MOSSE) to estimate the global motion parameter $\Delta_g$. This filter is fast and efficient and works well with turbulent video because the phase correlation update averages out the zero mean phase perturbations induced by turbulence. The local motion induced by turbulence must also be compensated in order to have a sharper image after frame averaging. Some embodiments involve enhancement before optical flow in order to improve the motion estimation. Enhancing before motion compensation reduces the number of possible motion vectors for each pixel. For video coding, intra-frame coding is used more when enhancing first therefore details are preserved whereas inter-frame coding is used more when there is low contrast which results in loss of details.

To remove fog effectively and efficiently for each frame and have an estimate of transmission, the method disclosed in U.S. patent application Ser. No. 14/501,400, titled "Single Image Contrast Enhancement Method Using the Adaptive Wiener Filter" of Gibson et al., may be used. The Wiener defogging method is 50 to 100 times faster than existing methods and can operate at real-time speeds for frames of sizes 720×480 and larger.

A modification to the Wiener defog method may be made in order to automate the defogging process. One step in removing fog with the Wiener defogging method is the proper choice of size for the smoothing window $\Omega$ in the spatial domain. The optimal $\Omega$ must be heuristically chosen for each image. This can be a cumbersome task for real-time video enhancements. The choice of window size is a common problem in single image defogging. A choice of two window sizes may be performed to properly refine the transmission estimate, but yet preserve depth discontinuities. The window should be sufficiently large to estimate a smooth transmission map that best reflects the scene depth.

Some embodiments of the disclosed method may automatically select $|\Omega|$ based on the statistics of the frames. Given a foggy color image $i \in \mathbb{R}^\psi$, fog may be removed by estimating the transmission t and recovering the true non-foggy image $o \in \mathbb{R}^\psi$. The number of color channels is denoted with $\psi$. While disclosure is made with regard to a 3-channel color image, the embodiments of the method can be used for grey images ($\psi=1$). As an assumption is made that the transmission is independent of wavelength, the image model (without motion, turbulence and blur) is the atmospheric dichromatic model $$i(x)=t(x)o(x)+(1-t(x))a+w(x). \quad (\text{Eq. 4})$$

The main idea in estimating the transmission with an adaptive local Wiener filter is that the observation model is composed of the veiling v=(1−t) and texture $n_{txt}$. The observation, the dark pixel measurement for each pixel, is $$d(x) = \min_{c \in (r,g,b)} i_c(x), \quad \text{(Eq. 5)}$$

where $i_c(x)$ is the $c^{th}$ color channel of the image $i(x)$. For grey images, $d(x)=i(x) \in \mathbb{R}$. The dark pixel measure in (Eq. 5) takes advantage of the atmospheric dichromatic model in (Eq. 5) by assuming at least one color component is possibly dark, therefore exposing the atmospheric veiling: $d(x) \sim (1-t(x))a_c + w_c(x)$ for $\min_{c \in r,g,b} o_c(c) \sim 0$. Thus, the model at each pixel is $$d(x) = v(x) + n_{txt} \quad \text{(Eq. 6)}$$

where $v$ is the true veiling and $n_{txt}$ is the textured noise. The observation is (Eq. 5) and the model is (Eq. 6). The goal in the Wiener defog method is to filter out the texture from the observation d by treating the texture $n_{txt}$ as noise but preserve edges from depth discontinuities. For images with a large amount of texture (e.g. forest floor with leaves), the size of the window must be sufficiently large to filter out the texture variations. The choice of $\Omega$ arises from the local moment estimators $$\hat{\mu}_v(x) = \frac{1}{|\Omega(x)|} \sum_{j \in \Omega(x)} d(x), \quad \text{(Eq. 7)}$$

$$\hat{\sigma}_v^2(x) = \frac{1}{|\Omega(x)|} \sum_{j \in \Omega(x)} d^2(x) - \hat{\mu}_v^2(x), \quad \text{(Eq. 8)}$$

where $|\Omega(x)|$ is the number of pixels within the local sample window positioned at a pixel location x.

The approach to estimating the optimum window size $|\Omega|$ is to choose a size sufficient enough to filter scene texture noise from the observation $\hat{\mu}_v$ in (Eq. 7) to a desired variance $\sigma_{e,\Omega}^2$, $$\sigma_{e,\Omega}^2 = \frac{\hat{\sigma}_{n_{txt}}^2}{|\Omega|} \Longrightarrow |\Omega| = \frac{\sigma_{n_{txt}}^2}{\sigma_{e,\Omega}^2} \quad \text{(Eq. 9)}$$

As an example $\sigma_{e,\Omega}^2$ may be equal to $5e^{-6}$. To determine $|\Omega|$, the variance of the texture is estimated. Taking the maximum variance from the local variance measurement $\hat{\sigma}_v^2(x)$ in (Eq. 8) is not practical since the higher variance measurements are from the depth discontinuities and edges in the scene. The goal in smoothing d is to preserve these edges. One approach is to estimate the texture noise in an image. The approach is to measure the average variance in all color channels from the observed image $i(x)$, $$\sigma_{n_{txt}}^2 = \frac{1}{3} \frac{1}{M} \sum_{c=1}^{3} \sum_{\forall x} \hat{\sigma}_{i,c}^2(x), \quad \text{(Eq. 10)}$$

where $$\hat{\mu}_{i,c}^2(x) = \frac{1}{|\Phi(x)|} \sum_{y \in \Phi(x)} i_c(y), \quad \text{(Eq. 11)}$$

$$\hat{\sigma}_{i,c}^2(x) = \frac{1}{|\Phi(x)|} \sum_{y \in \Phi(x)} i_c^2(y) - \hat{\mu}_{i,c}^2(x), \quad \text{(Eq. 12)}$$

and where M is the total number of pixels in an image. A sample window size $|\Phi|$ is selected initially in order to estimate the local mean and variance of the image. As an example, a sample window $\Phi = 32 \times 32$ may be used for all image sequences. The sample window size $|\Omega|$ is estimates using (Eqs. 9 and 10) with $\sigma_{e,\Omega}^2 = 5e^{-6}$ for images scaled to pixel values to [0,1].

The Wiener defogging method estimates the fog-free image $\hat{o}$ and transmission $\hat{t}$, $$\hat{o}, \hat{t} \leftarrow \text{WienerDefog}(i, \Omega, t_0, d_p, 1), \quad \text{(Eq. 13)}$$

where $\Omega$ is the $|\Omega|^{1/2} \times |\Omega|^{1/2}$ size sample window, $t_0$ is the minimum possible transmission value used for numerical conditioning, $d_p$ is the weight used to change the strength of the enhancement and the last parameter, 1, indicates the single-step approach is used. Typical values for $t_0$ and $d_p$ are $1e^{-2}$ and 0.9, respectively.

It is observed that the transmission estimation is invalid when there is a significant variation in fog causing the model described by (Eq. 6) to be invalid because the veiling and noise are not statistically independent. The texture variation $n_{txt}$ is dependent on the amount of fog. Thus, the first step naively assumes the model is valid in order to remove fog and to provide the ability to re-estimate the local moments $o_n^2$ and $o_v^2$ that are indeed statistically uncorrelated in the 2-step approach. It also has been observed that images with significant depth discontinuities (e.g. buildings in near foreground with sky as backdrop), the 2-step approach is needed. The one-step approach may be sufficient for most of the embodiments disclosed herein because the noise is not significantly dependent on fog.

The Wiener defogging method estimates air light where it is assumed that if the sky is present in an image (t=0), the brightest pixels are the actual air light color a. A practical implementation is to pick the 0.1% darkest pixels in the transmission estimate $\hat{t}$ to estimate the airlight $a=(a_1, a_2, a_3)^T$, $$a_c = \frac{1000}{M} \sum_y i_c(y) : \hat{t}(y) \le T, \quad \text{(Eq. 14)}$$

where T represents a threshold chosen such that there are M/1000 pixels that have a value lower than T.

The variance of temporally averaging (denoted with angle brackets) a defogged image sequence that has already been aligned with motion compensation is $$\text{var}[\langle \text{defog}(i(x)) \rangle] \approx \frac{1}{K} \left( \sigma_o^2(x) + \frac{\sigma_\omega^2}{\mu_t^2(x)} \right). \quad \text{(Eq. 15)}$$

The noise variance is reduced with K but amplified with $\langle t(x) \rangle_K^2 = \mu_t^2(x)$. In order to reduce the noise power, the averaging parameter K must depend on the time averaged transmission $\mu_t(x)$. One approach is to choose a large K value, but this is not ideal for most scenes where a smaller K is a better choice to prevent excessive blur.

The fewer the number of frames used for averaging, the less blur will occur if the frames are well aligned. A global averaging method helps to reduce flickering and achieve low complexity however adaptive to the signal noise and contrast. An approach to solve the problem is to provide a method for determining the lower bound for K given a desired $o_{e,K}^2$. This is achieved by using the maximum transmission value $t_{max}$ estimated from the image sequence. Therefore, the minimum number of frames to average for an image sequence with M pixels per frame can be determined with a contrast dependent measure and averaged $o_o^2$, $$K_{min} = \frac{1}{o_{e,K}^2} \left( \frac{1}{M} \sum_x \hat{o}_o^2(x) + \frac{\hat{o}_\omega^2}{t_{max}^2} \right), \tag{Eq. 16}$$

with $t_{max}$: $t_{max} \geq \hat{t}(x) \forall x$. As an example, $o_{e,K}^2 = 2 \times 10^{-5}$, but other values may be used as determined by a user.

After the image $i(x)$ has been defogged, motion compensated, and frame averaged, the next step is to remove the blur caused by the atmosphere and image alignment errors (deblur). In some embodiments, a Wiener Deconvolution method may be used for this purpose. In order to remove the blur, a kernel must be known. One approach is to apply a blind deconvolution method. For isoplanatic conditions, the blur kernel is not exactly known but the structure is. There are two different forms of the optical transfer function (OTF), or blur kernel, due to turbulence: one for long exposure and the second for short exposure. The exposure time is in relation to the atmospheric turbulence. Short exposure measurements effectively freeze the turbulence during the image capture integration time. Only one instance of turbulence is captured in a short exposure frame. Long exposure is an integration of multiple turbulent instances in one frame capture. In embodiments of the method herein, the long exposure model may be used since the frames are averaged together.

Given an OTF that represents the blur from turbulence, $H(u, \lambda)$, where u is the spatial frequency and $\lambda$ is the optical wavelength (color channel), the long exposure OTF is $$H_{LE}(u, \lambda) = e^{-\frac{1}{2} 6.88 \left( \frac{\lambda l}{r_0} |u| \right)^{5/3}} \tag{Eq. 17}$$

The optic focal length is l. The parameter $\alpha$ is for near ($\alpha$=1) and far field ($\alpha$=0.5). From experiments, the far field imaging is addressed, therefore $\alpha$=0.5. The Fried parameter is $r_0$. Modifying the ratio $l/r_0$ for both short and long exposure is sufficient for situations when the optical system and seeing parameters are not known, and in fact is a common situation because $r_0$ is typically unknown.

To illustrate that the turbulence has been mitigated in time, a Turbulence Mitigation Metric (TMM) is presented. The goal in turbulence mitigation is to not only recover the true structure (phase) of the scene but also to enforce temporal consistency in each color channel. Instead of using a subjective measure by displaying multiple frames of a video sequence, an objective measure is developed. The goal in designing the TMM is to make it an objective measure of turbulence mitigation, simple to construct, and easily accessible such that it can be used in any other turbulence mitigation method. One approach to developing a TMM is to utilize the motion estimated from optical flow and global estimations. This approach, however, is complex given that not every method uses optical flow. It is desired to only require an input image sequence and output image sequence.

The TMM is a measurement between the input image sequence i and the output image sequence o, $$TMM(i, o) = \frac{\|i\|_{TV1} - \|o\|_{TV1}}{\|i\|_{TV1}}, \tag{Eq. 18}$$

where the TV/L1 norm, $\|f\|_{TV1}: \mathbb{R}^{M_1 \times M_2 \times 3 \times K} \to \mathbb{R}$, is $$\|f\|_{TV1} = \sum_{x,\lambda} \sum_{k=0}^{K-1} |f(x, \lambda, k) - f(x, \lambda, k-1)| \tag{Eq. 19}$$

where each image sequence is of spatial dimension $M_1 \times M_2$, has 3 color ($\lambda$) channels, and is of length K frames. This is simply a total variation (TV) measurement in the time domain similar to the anisotropic TV norm where the spatial weights are set to zero and the time weight factor is set to one. Additionally, (Eq. 19) accumulates the variation for all color channels.

If the turbulence is reduced, then the value of the TMM approaches unity. The TMM may be negative if the input sequence exhibits less turbulence than the output sequence. When contrast enhancement is involved, it is important to measure $\|f\|_{TV1}$ immediately after contrast enhancement. This is because the color variances are smaller when fog is present and the color variations in time are smaller compared to the same image sequence with the contrast enhanced, which would produce erroneous negative TMM values.

Figure 2:
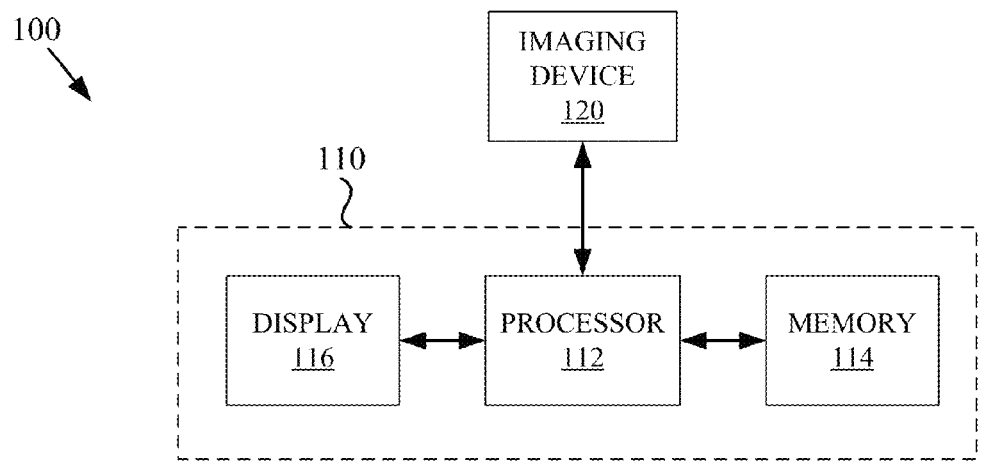
FIGS. 2 and 3 show diagrams illustrating embodiments of a system configured to perform the methods in accordance with the Joint Contrast Enhancement and Turbulence Mitigation Method.

FIG. 2 shows a diagram 100 illustrating an embodiment of a system 110 configured to perform the methods in accordance with the Joint Contrast Enhancement and Turbulence Mitigation Method. System 110 includes a processor 112 operatively connected, such as via a wired or wireless connection, to a memory module 114 and display 116. Processor 112 may be a general purpose processing device or a processing device specifically programmed to perform the embodiments of the method disclosed herein. Memory module 114 is configured to store various types of data therein and may include computer-implementable instructions stored therein for performing the embodiments of the method, such as method 900, disclosed herein. Display 116 may comprise a general purpose display device as recognized by one having ordinary skill in the art. System 110 is operatively connected, such as via a wired or wireless connection, to an imaging device 120, which may comprise any type of image capture device known in the art, such as a video camera, smart phone, digital camera, or the like.

In operation, imaging device 120 may provide image data, either delayed or in real-time, to processor 112. Processor 112 may then execute computer-implementable instructions stored therein or stored within memory module 114, to remove any contrast reducing scattering medium present in the image data and cause a contrast enhanced image to be displayed to a user on display 140.

Figure 3:
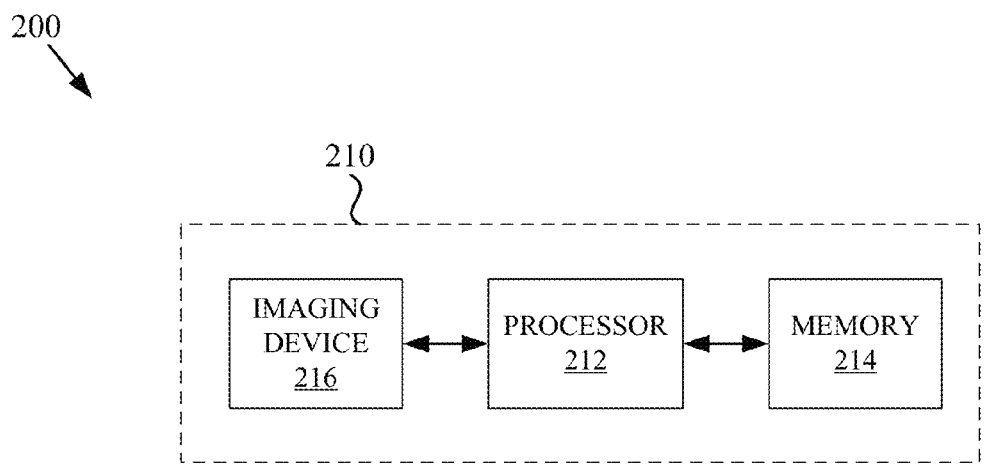

FIG. 3 shows a diagram 200 of illustrating an embodiment of a system 210 configured to perform the methods in accordance with the Joint Contrast Enhancement and Turbulence Mitigation Method. System 210 includes a processor 212 operatively connected, such as via a wired or wireless connection, to a memory module 214 and imaging device 216.

The components shown in FIG. 3 may be the same as or similar to the components shown in FIG. 2, with the difference being that system 210 includes imaging device 216, while system 210 is operatively connected to imaging device 220 and may include a separate display.

In operation, imaging device 216 may provide image data, either delayed or in real-time, to processor 212. Processor 212 may then execute computer-implementable instructions stored therein or stored within memory module 214, to remove any contrast reducing scattering medium present in the image data and cause a contrast enhanced image to be displayed to a user on imaging device 216.

Systems 100 and 200 may be configured with the appropriate software modules to perform the embodiments of the method, such as method 900, as discussed herein. As an example, processors 112 and 212 may have such modules stored therein, or, memory modules 114 and 214 may have such modules stored therein, which are accessed by processors 112 and 212, respectively. The term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Thus, the use of the term "module" herein, indicates reference to such software modules or implementations thereof.

Figure 4:
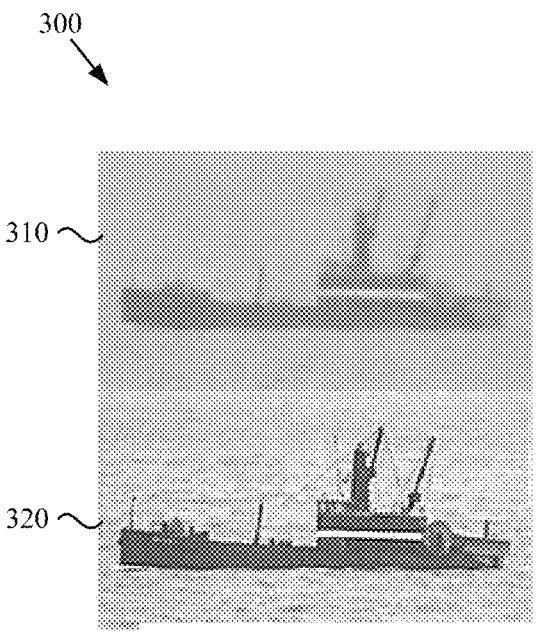
FIGS. 4-7 show input images and output images of objects in accordance with the Joint Contrast Enhancement and Turbulence Mitigation Method.
Figure 5:
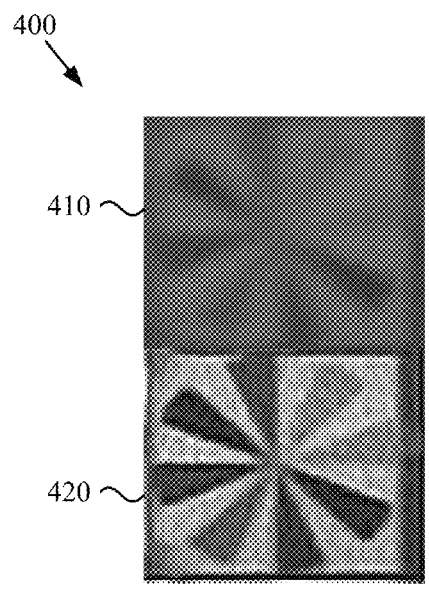
Figure 6:
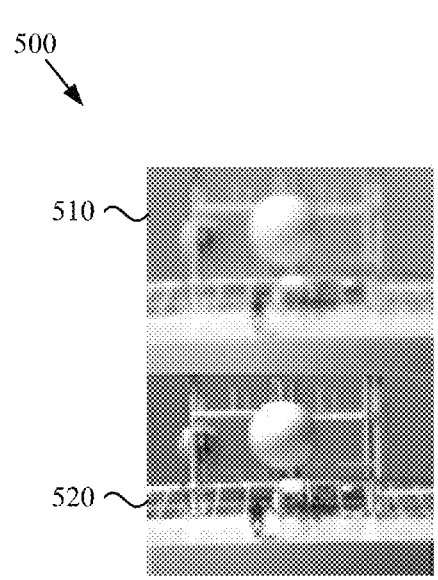
Figure 7:
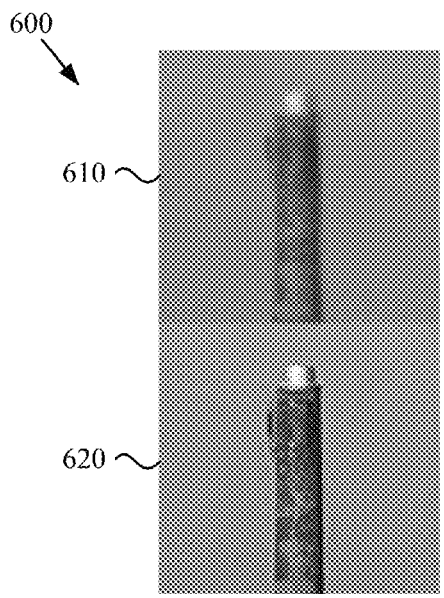

FIGS. 4-7 show input images and output images of objects in accordance with the Joint Contrast Enhancement and Turbulence Mitigation Method. FIG. 4 shows a diagram 300 with an input image 310 of a boat within a contrast reducing scattering medium and an output image 320 representing the processed image in accordance with the method disclosed herein. FIG. 5 shows a diagram 400 with an input image 410 of a star image within a contrast reducing scattering medium and an output image 420 representing the processed image in accordance with the method disclosed herein. FIG. 6 shows a diagram 500 with an input image 510 of a tower within a contrast reducing scattering medium and an output image 520 representing the processed image in accordance with the method disclosed herein. FIG. 7 shows a diagram 600 with an input image 610 of a chimney within a contrast reducing scattering medium and an output image 620 representing the processed image in accordance with the method disclosed herein.

Figure 8:
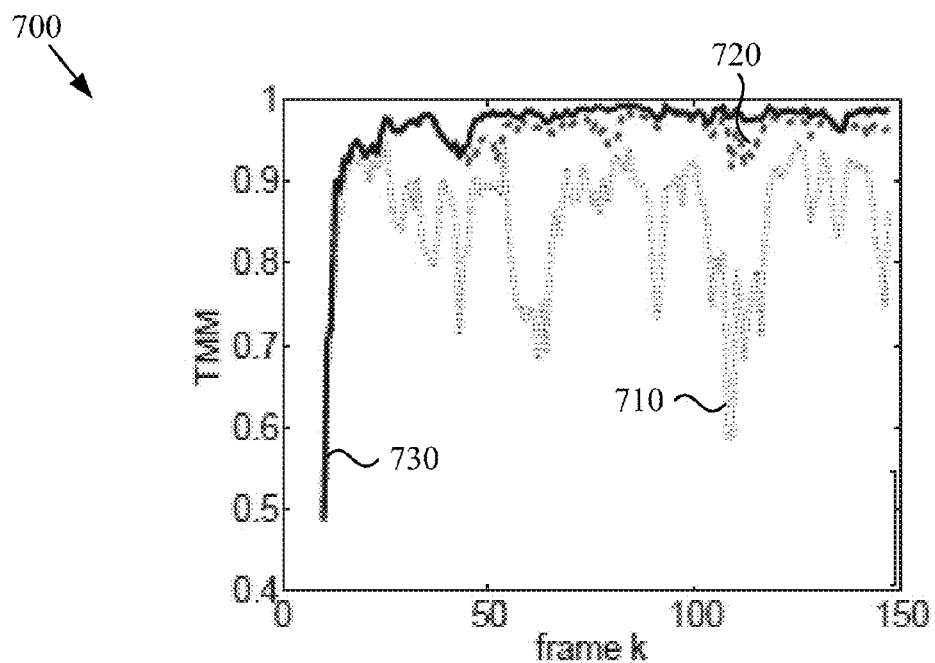
FIG. 8 shows a graph illustrating turbulence mitigation metrics for various values of K in accordance with the Joint Contrast Enhancement and Turbulence Mitigation Method.
Figure 9:
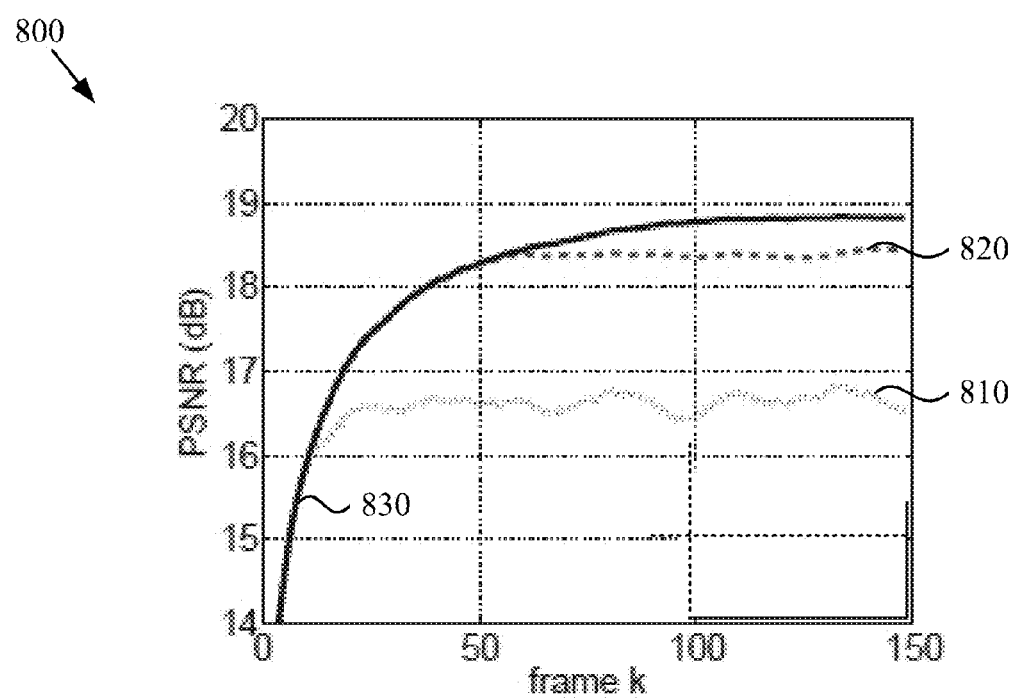
FIG. 9 shows a graph illustrating the peak-to-signal noise ratio for various values of K in accordance with the Joint Contrast Enhancement and Turbulence Mitigation Method.

FIG. 8 shows a graph 700 illustrating TMMs for various values of K in accordance with the Joint Contrast Enhancement and Turbulence Mitigation Method. Line 710 represents the TMM for K=10, line 720 represents the TMM for K=44, and line 730 represents the TMM for K=90. FIG. 9 shows a graph 800 illustrating the peak-to-signal noise ratio (PNSR) for various values of K in accordance with the Joint Contrast Enhancement and Turbulence Mitigation Method. Line 810 represents the PNSR for K=10, line 820 represents the PNSR for K=44, and line 830 represents the PNSR for K=90.

Figure 10:
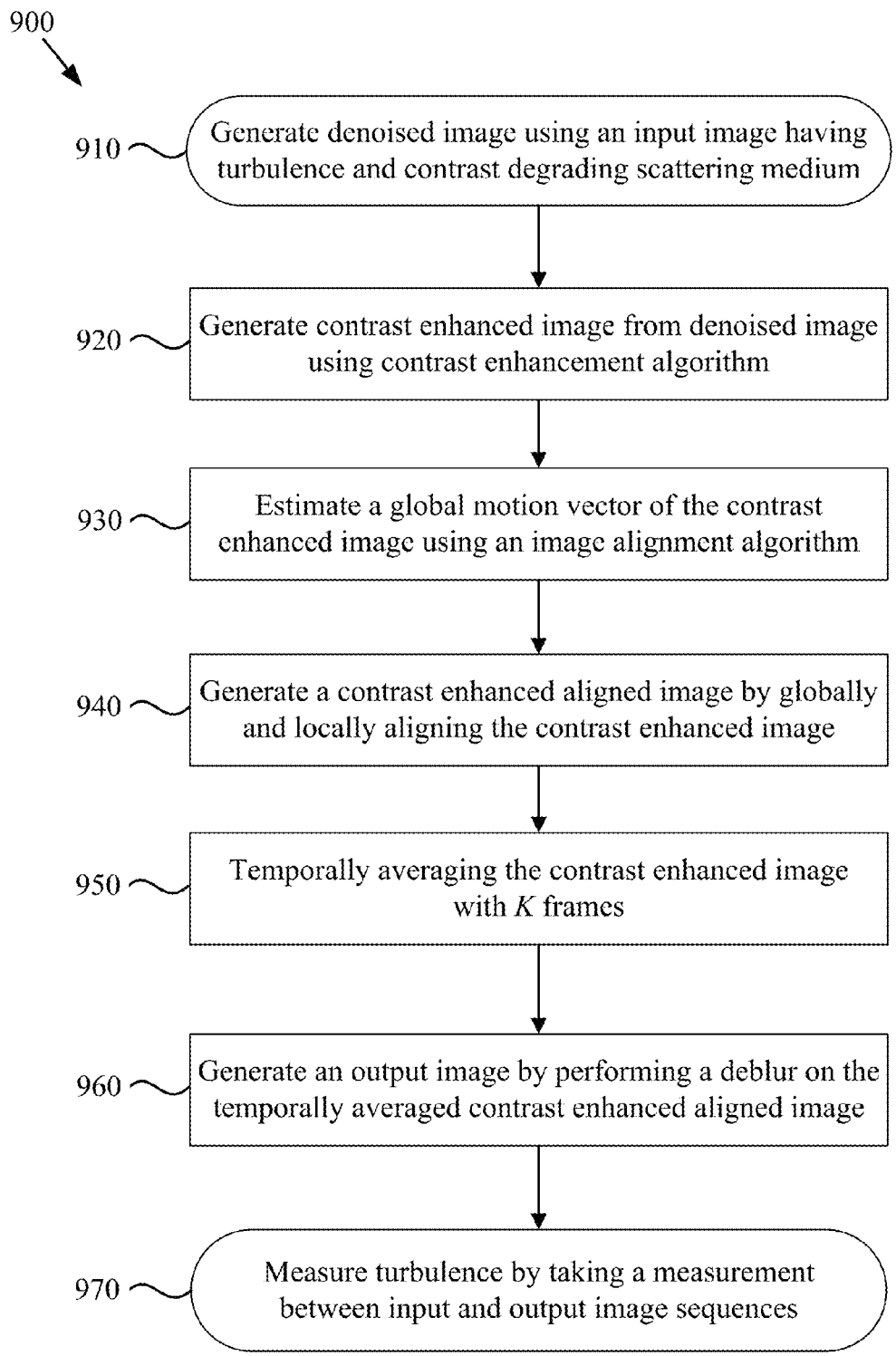
FIG. 10 shows a flowchart of an embodiment of a method in accordance with the Joint Contrast Enhancement and Turbulence Mitigation Method.

FIG. 10 shows a flowchart of an embodiment of a method 900 in accordance with the Joint Contrast Enhancement and Turbulence Mitigation Method. Method 900 disclosed herein may be implemented as a series of modules, either functioning alone or in concert with physical electronic and computer hardware devices. Such modules may be utilized separately and/or together locally and/or remotely to form a program product thereof, that may be implemented through recordable media. Method 900 may be implemented as a program product comprised of a plurality of such modules, which can be interactively displayed for a user on a display, such as display 116 or imaging device 216.

Some or all of the steps of method 900 may be stored on a non-transitory computer readable storage medium, wherein the steps are represented by computer-readable programming code. The steps of method 900 may also be computer-implemented using a programmable device, such as a computer-based system. Method 900 may comprise instructions that, when loaded into a computer-based system, cause the system to execute the steps of method 900. Method 900 may be computer-implemented using various programming languages, such as "Java", "C", or "C++". Further, method 900 may be implemented within a system such as system 100 shown in FIG. 2 or system 200 shown in FIG. 3.

For illustrative purposes, method 900 will be discussed with reference to the steps being performed by processors 112 or 212, using instructions stored therein or memory modules 114 or 214, respectively, with the image input provided by imaging devices 120 or 216, respectively and the image output being displayed on display 116 or imaging device 216, respectively.

Additionally, while FIG. 9 shows one embodiment of method 900 to include steps 910-970, other embodiments of method 900 may contain fewer or more steps. Further, while in some embodiments the steps of method 900 may be performed as shown in FIG. 9, in other embodiments the steps may be performed in a different order, or certain steps may occur simultaneously with one or more other steps.

Method 900 begins at step 910, which involves generating a denoised image by performing a denoising operation on an input image of an object $\hat{o}_k(x)$. The input image sequence, such as image 310, 410, 510, and 610, includes turbulence and a contrast reducing scattering medium therein, examples of which include fog, haze, water, or dust. In some embodiments, the denoising operation is performed by a median filter, such as a two-dimensional median filter.

Step 920 involves generating a contrast enhanced image from the denoised image using a contrast enhancement algorithm. In some embodiments, the contrast enhancement algorithm is a locally adaptive wiener filter. It should be noted that other contrast enhancement algorithms may be used including, but not limited to, histogram equalization, contrast limited histogram equalization, and the median dark channel prior method.

Step 930 involves estimating a global motion vector $\hat{\Delta}_{g,k}$ of the contrast enhanced image using an image alignment algorithm. In some embodiments, the image alignment algorithm is a minimum output sum of squared error adaptive correlation filter, such as is described by Bolme et al. Other image alignment algorithms may be used, including, but not limited to, phase correlation tracking Kanade-Lucas-Tomasi feature tracking, and feature tracking using SURF.

Step 940 involves generating a contrast enhanced aligned image by globally aligning the contrast enhanced image to $\hat{\Delta}_{g,k}$ and locally aligning the contrast enhanced image with an optical flow method. In some embodiments, step 940 is performed by the image alignment algorithm. In some embodiments, the optical flow method is a dense optical flow block-based method so that every pixel has a motion vector associated with it. The motion vectors are used to warp the images to be aligned with each other.

Step 950 involves temporally averaging the contrast enhanced aligned image with K frames. In some embodiments, the step of temporally averaging the contrast enhanced aligned image comprises determining a lower bound for, $K_{min}$, according to the equation $K_{min}=$ $$\frac{1}{\hat{\sigma}_{e,K}^2}\left(\frac{1}{M}\sum_x \hat{\sigma}_o^2(x) + \frac{\hat{\sigma}_\omega^2}{\hat{t}_{max}^2}\right),$$

with $t_{max}:t_{max}>\hat{t}(x)$ for all x, where M is the total number of pixels in the contrast enhanced aligned image, where $t_{max}$ is the maximum transmission value, $o_{e,K}^2$ is a desired variance (i.e. $2\times 10^{-5}$), $\hat{\sigma}_o^2(x)$ is the variance of the defogged image in time at pixel x, $\hat{\sigma}_\omega^2$ is the noise variance in time, $\hat{t}(x)$ is the estimated transmission at pixel location x. In some embodiments, the temporal averaging is performed by averaging each pixel through time.

In some embodiments, the number of frames K to average is automatically determined using feedback regarding the TMM determined at step 970. This determination may be performed by a user setting a desired TMM, e.g. 0.95 or other desired value, and the algorithm will either decrease or increase the number of frames K to reach the desired TMM value of 0.95 within a reasonable tolerance, which may also be user selected.

Step 960 involves generating an output image, such as images 320, 420, 520, and 620, of the object $\hat{o}_k(x)$ by performing a deblur operation on the temporally averaged contrast enhanced aligned image. In some embodiments, the deblur operation involves a the Richardson-Lucy Deconvolution method.

Step 970 involves measuring turbulence using a turbulence mitigation metric (TMM). In some embodiments, step 970 comprises taking a measurement between an input image sequence i and an output image sequence o, where each of i and o are of spatial dimension $M_1 \times M_2$, have three color channels, and are of length K frames. In some embodiments, the TMM is measured using a sequence of input images that each have been denoised and defogged, such as shown in FIG. 1. In some embodiments, method 900 may further comprise the step of outputting the output image to a display, such as display 116 or imaging device 216. In some embodiments, the TMM may be used as a way to change the number of frames K, via feedback provided to step 950 regarding the determined TMM. If a desired TMM value is set, the algorithm could change K to meet that specific TMM.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Joint Contrast Enhancement and Turbulence Mitigation Method are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A method comprising the steps of:
   generating a denoised image by performing a denoising operation on an input image of an object $\hat{o}_k(x)$, the input image having turbulence and a contrast reducing scattering medium therein;
   generating a contrast enhanced image from the denoised image using a contrast enhancement algorithm;
   estimating a global motion vector $\hat{\Delta}_{g,k}$ of the contrast enhanced image using an image alignment algorithm;
   generating a contrast enhanced aligned image by globally aligning the contrast enhanced image to $\hat{\Delta}_{g,k}$ and locally aligning the contrast enhanced image with an optical flow method;
   temporally averaging the contrast enhanced aligned image with K frames;
   generating an output image of the object $\hat{o}_k(x)$ by performing a deblur operation on the temporally averaged contrast enhanced aligned image; and
   measuring turbulence using a turbulence mitigation metric (TMM).

2. The method of claim 1, wherein the step of temporally averaging the contrast enhanced aligned image with K frames includes the step of automatically determining K using a previously measured TMM.

3. The method of claim 1, wherein the TMM is a measurement between an input image sequence i and an output image sequence o, where each of i and o are of spatial dimension $M_1 \times M_2$, have three color channels, and are of length K frames.

4. The method of claim 1, wherein the denoising operation is performed by a two-dimensional median filter.

5. The method of claim 1, wherein the contrast enhancement algorithm is a locally adaptive wiener filter.

6. The method of claim 1, wherein the image alignment algorithm is a minimum output sum of squared error adaptive correlation filter.

7. The method of claim 1, wherein the step of temporally averaging the contrast enhanced aligned image comprises determining a lower bound for, $K_{min}$, according to the equation $$K_{min} = \frac{1}{\hat{\sigma}_{e,K}^2}\left(\frac{1}{M}\sum_x \hat{\sigma}_o^2(x) + \frac{\hat{\sigma}_\omega^2}{\hat{t}_{max}^2}\right),$$

with $t_{max}:t_{max}>\hat{t}(x)$ for all x, where M is the total number of pixels in the contrast enhanced aligned image, where $t_{max}$ is a maximum transmission value, $o_{e,K}^2$ is a desired variance, $\hat{\sigma}_o^2(x)$ is a variance of a defogged image in time at pixel x, $\hat{\sigma}_\omega^2$ is a noise variance in time, and $\hat{t}(x)$ is an estimated transmission at pixel location x.

8. The method of claim 1, wherein the optical flow method is a dense optical flow block-based method, wherein every pixel has a motion vector associated with it, wherein the motion vectors are used to warp the images to be aligned with each other.

9. A system comprising:
a processor operatively connected to an imaging device, wherein the processor is configured, via programming instructions accessible thereto, to perform the steps of:
  generating a denoised image by performing a denoising operation on an input image of an object $ô_k(x)$, the input image having turbulence and a contrast reducing scattering medium therein;
  generating a contrast enhanced image from the denoised image using a contrast enhancement algorithm;
  estimating a global motion vector $\hat{\Delta}_{g,k}$ of the contrast enhanced image using an image alignment algorithm;
  generating a contrast enhanced aligned image by globally aligning the contrast enhanced image to $\hat{\Delta}_{g,k}$ and locally aligning the contrast enhanced image with an optical flow method;
  temporally averaging the contrast enhanced aligned image with K frames;
  generating an output image of the object $ô_k(x)$ by performing a deblur operation on the temporally averaged contrast enhanced aligned image; and
  measuring turbulence using a turbulence mitigation metric (TMM).

10. The system of claim 9, wherein the step of temporally averaging the contrast enhanced aligned image with K frames includes the step of automatically determining K using a previously measured TMM.

11. The system of claim 9, wherein the TMM is a measurement between an input image sequence i and an output image sequence o, where each of i and o are of spatial dimension $M_1 \times M_2$, have three color channels, and are of length K frames.

12. The system of claim 9, wherein the denoising operation is performed by a two-dimensional median filter.

13. The system of claim 9, wherein the contrast enhancement algorithm is a locally adaptive wiener filter.

14. The system of claim 9, wherein the image alignment algorithm is a minimum output sum of squared error adaptive correlation filter.

15. The system of claim 9, wherein the step of temporally averaging the contrast enhanced aligned image comprises determining a lower bound for, $K_{min}$, according to the equation $$K_{min} = \frac{1}{o_{e,K}^2}\left(\frac{1}{M}\sum_x \hat{\sigma}_o^2(x) + \frac{\hat{\sigma}_\omega^2}{\hat{t}_{max}^2}\right),$$

with $t_{max}$:$t_{max} > \hat{t}(x)$ for all x, where M is the total number of pixels in the contrast enhanced aligned image, where $t_{max}$ is a maximum transmission value, $o_{e,K}^2$ is a desired variance, $\hat{\sigma}_o^2(x)$ is a variance of a defogged image in time at pixel x, $\hat{\sigma}_\omega^2$ is a noise variance in time, and $\hat{t}(x)$ is an estimated transmission at pixel x.

16. The system of claim 9, wherein the optical flow method is a dense optical flow block-based method, wherein every pixel has a motion vector associated with it, wherein the motion vectors are used to warp the images to be aligned with each other.

* * * * *